United States Patent [19]

Diekhans

[11] Patent Number: 5,795,221
[45] Date of Patent: Aug. 18, 1998

[54] DEVICE FOR AND A METHOD OF A THROUGHPUT MEASUREMENT IN AGRICULTURAL MACHINES

[75] Inventor: Norbert Diekhans, Gütersloh, Germany

[73] Assignee: Claas KgaA, Harsewinkel, Germany

[21] Appl. No.: 676,426

[22] Filed: Jul. 8, 1996

[30] Foreign Application Priority Data

Jul. 7, 1996 [DE] Germany ............... 195 24 752.3

[51] Int. Cl.⁶ ..................................... A01F 12/00
[52] U.S. Cl. ................. 460/6; 460/149; 56/10.2 G
[58] Field of Search ................ 460/6, 1, 7, 149; 56/10.2 G, 10.2 H

[56] References Cited

U.S. PATENT DOCUMENTS

| 4,765,190 | 8/1988 | Strubbe ............ 56/10.2 G X |
| 5,312,299 | 5/1994 | Behnke et al. ...... 56/10.2 G X |
| 5,318,475 | 6/1994 | Schrock et al. ......... 460/6 X |
| 5,480,354 | 1/1996 | Sadjadi .................. 460/7 |

FOREIGN PATENT DOCUMENTS

| 1199039 | 3/1996 | Germany . |
| 2155666 | 9/1985 | United Kingdom . |

OTHER PUBLICATIONS

Von Manfred, "Stand der Regelurgstechnik beim Mahdrescher", Aug. 19, 1965, pp. 41–50, paper No. DK 621-5:631.354.2.

*Primary Examiner*—Terry Lee Melius
*Attorney, Agent, or Firm*—Michael J. Striker

[57] ABSTRACT

An agricultural machine, in particular a field chopper, has a device for measuring a throughput of harvested producted with the use of a first element which senses a vertical movement of a prepressing roller by the harvested product and a second element which determines a throughflow speed, while corresponding signal values produced by the elements are continuously supplied to a microprocessor to compute an absolute quantity measuring value.

24 Claims, 3 Drawing Sheets

1

DEVICE FOR AND A METHOD OF A THROUGHPUT MEASUREMENT IN AGRICULTURAL MACHINES

BACKGROUND OF THE INVENTION

The present invention relates to a device for and a method of a throughput measurement in agricultural machines.

More particularly, it relates to an agricultural machine for picking up and treating a harvested product, in particular field chopper, which is provided with a device for measurement of a throughput of the harvested product. Field choppers are used to comminute grass, corn, or other harvested products, to be used as fodder and alike.

The German document DBP 11 99 039 discloses devices for regulating the forward speed, in order to measure the relative loading of machine components and derive a nominal value for regulation of the forward speed. Furthermore, the publication "Grundlagen der Landtechnik", volume 16 (1966) number 2, page 45, discloses different possibilities as to at which points possible measurements for throughflow determination can be provided on cutting, picking up, and threshing elements of the harvester thresher. It is proposed, among others, to use the deviation of the inclined elevator chain as a measuring value. The patent application GP 2 155 666 discloses a self-propelling field chopper in which the throughput quantity is measured in dependence on the traveling speed of the machine, the rotary speed of the chopping drum and the torque required for driving of the chopping drum.

The measuring points proposed for the harvester thresher in order to determine throughflow quantity can not be simply transferred to a field chopper, since other machine components are used which are not comparable with the components of the harvester thresher or similar components are used which because of the technical frame conditions do not perform a comparable function. When the deviations of the inclined elevator chain or an inclined elevator rocker are proposed as measuring points, the measuring values are always supplied to a relative forward speed regulation. The requirements which are now applied to the accuracy of a throughflow quantity measurements are however increased, so that a partial surface-specific measuring value can be used as a comparison value for field related features. For such utilization of the measuring values, relative signals are not sufficient. The measuring values determined at the proposed point with the proposed means are inaccurate for deriving from them a correct absolute measuring value. The torque measurement proposed for a field chopper on the chopping drum can not supply any accurate quantity measurement values. The reason is that the torque required for driving the chopping drum is influenced by a plurality of factors, such as for example tension and slippage of the drive belt, sharpness of the cutter, cutting gap between cutters and countercutters, type and moisture of the harvested product and lubrication and wear of the drum bearing. With consideration of these factors of influence it is difficult to find a measuring point for determination of the actual throughflow quantity.

SUMMARY OF THE INVENTION

Accordingly, it is an object of the present invention to provide a device for and method of measurement of a throughput for harvested products in a field chopper, whose measuring points insure an accurate measurement of the absolute throughput quantity.

In keeping with these objects and with others which will become apparent hereinafter, one feature of the present invention resides, briefly stated, in a device for throughput measurement, having an element converting a vertical movement of at least a prepressing roller by the entering of the harvested product into a signal value, and another element which measures the throughflow speed of the product stream flowing through the machine and converts the measured value into a signal value, and both signal values are supplied continuously to a microprocessor which calculates an absolute quantity value from these signal values.

In accordance with a preferable embodiment of the present invention, the signal value for the vertical movement of at least one prepressing roller is produced by a potentiometer which is connected through a lever system with a prepressing roller, and the rotary movement of the potentiometer axis actuated by the lever system is converted by the potentiometer into a proportional voltage. The roller whose movement is measured must be located as far behind as possible in the prepressing passage.

The signal value for the throughflow speed of the product stream flowing through the machine is first produced by at least one rotary speed sensor associated directly or indirectly with the prepressing roller. The rotary speed sensor can be formed in a known manner, such as for example as an inductive transducer, a tachogenerator, a Hall transducer, a Reed contact or a light barrier. The inductive transducer can measure fractions of revolutions, for example half revolutions. When the transporting roller does not have a smooth surface, the calculations are performed for the speed determination of the flowing harvested product from the average diameter of the transporting roller whose rotary speed is measured.

For providing an electronic circuitry for measurements of the throughput it is advantageous to continuously measure the deviation of the pressing roller with a high sensing rate of higher than 100 Hz and then to supply this signal to a suitable average value formation, so that a uniform yield signal is obtained. The yield signal can be identified with the associated position of the field chopper on a board computer or another data carrier. The identification can be performed selectively either in a time rhythm or after a predetermined path or in dependence on the magnitude of the changes of the throughput signal.

For correcting the measuring and calculated throughflow quantity, it is proposed in accordance with a further embodiment of the present invention, to use known sensor systems for loading determination, for example torque measurement of the chopper drum, of the attachment device, or of the motor, or the slipage measurement of the drive belt of the chopper drum to correct the determined measuring value. As a measure for the torque measurement of the motor, it is possible to use the measure of the rotary speed pressure force with respect to the motor rotary speed or to determine and evaluate the injection quantity of an electronic motor regulator (E-gas).

The loading of the machine elements monitored by the sensor system for loading determination depends on changing sharpness of the chopping cutter. Therefore in order to associate a measured loading to a concrete throughflow quantity, continuously the correlation of the measuring values determined by the sensor system for loading detection and the throughput measuring device are adjusted to the changing sharpness of the cutter of the chopping device.

In accordance with the inventive method for measurement of the throughput, a microprocessor is used for calculation of the throughput quantity in a region which the measured vertical deviation of a prepressing roller moves not in the region of definite limiting values of the upper and lower abutment only the signal values determined by the through measuring device, while the microprocessor in the region of the definite limiting values in which the measured horizontal deviation of the prepressing roller approaches or strikes the upper and lower abutments the signal values determined by the throughput measuring device are put into account with the measuring values determined by the sensor system for loading determination. The microprocessor additionally adjusts the cadulation of the measuring values determined by the optical system for measurement determination and the throughput measurement device to the changing sharpness of cutter of the chopping device. When the prepressing roller approaches the measure deviation in the region of definite limiting value in which the determined signal values of the throughput measuring device are put into account with the measuring values determined by the sensor system for the loading determination, a corrective factor can be derived from the measuring values determined by the sensor system for the loading determination and used during reaching of the definite limiting value of the measured deviation of the prepressing roller as a calculation factor.

With the use of the inventive device it is possible to determine with inexpensive low cost means, an exact value of the actual throughflow quantity of the harvested product flowing through the machine. The selected components have a high reliability and low maintenance. The quantity value computed by the microprocessor can be easily processed or stored in subsequent indicating or machine management systems.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED
EMBODIMENTS

Figure 1:
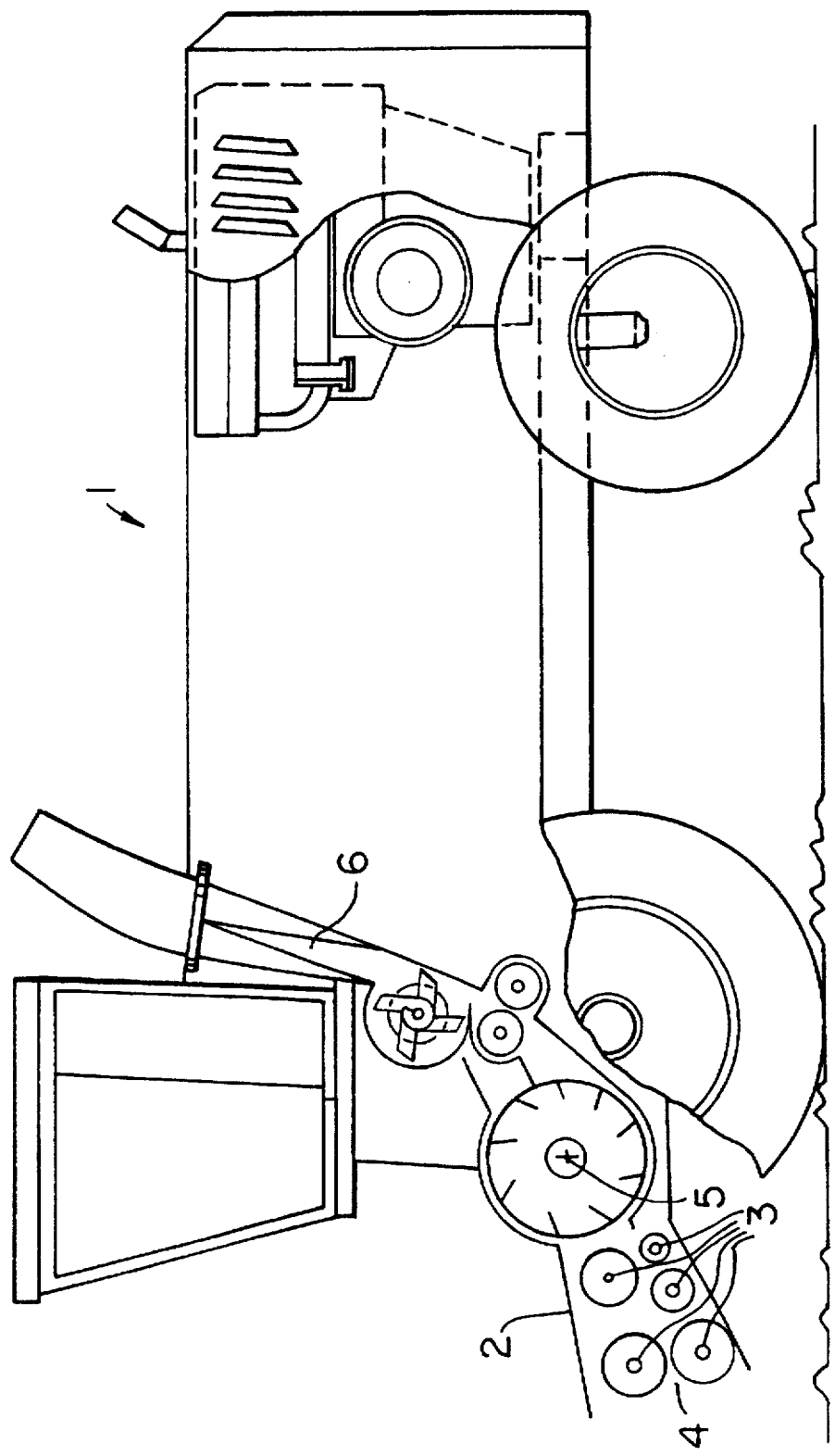
FIG. 1 is a schematic side view of an agricultural machine formed as a field chopper.

A field chopper is identified in FIG. 1 as a whole with reference numeral 1. It has a supply device 2 composed of a plurality of prepressing rollers. The harvested product flows from a not shown pickup device into a gap 4 formed between the prepressing rollers 3 located one above the other. The product streams flows through the gap 4 formed between further prepressing rollers 3 arranged above and below the product flow, in direction toward a chopping drum 5. The product flow is cut by the chopping drum 5 and then discharged in a throwing passage 6.

Figure 2:
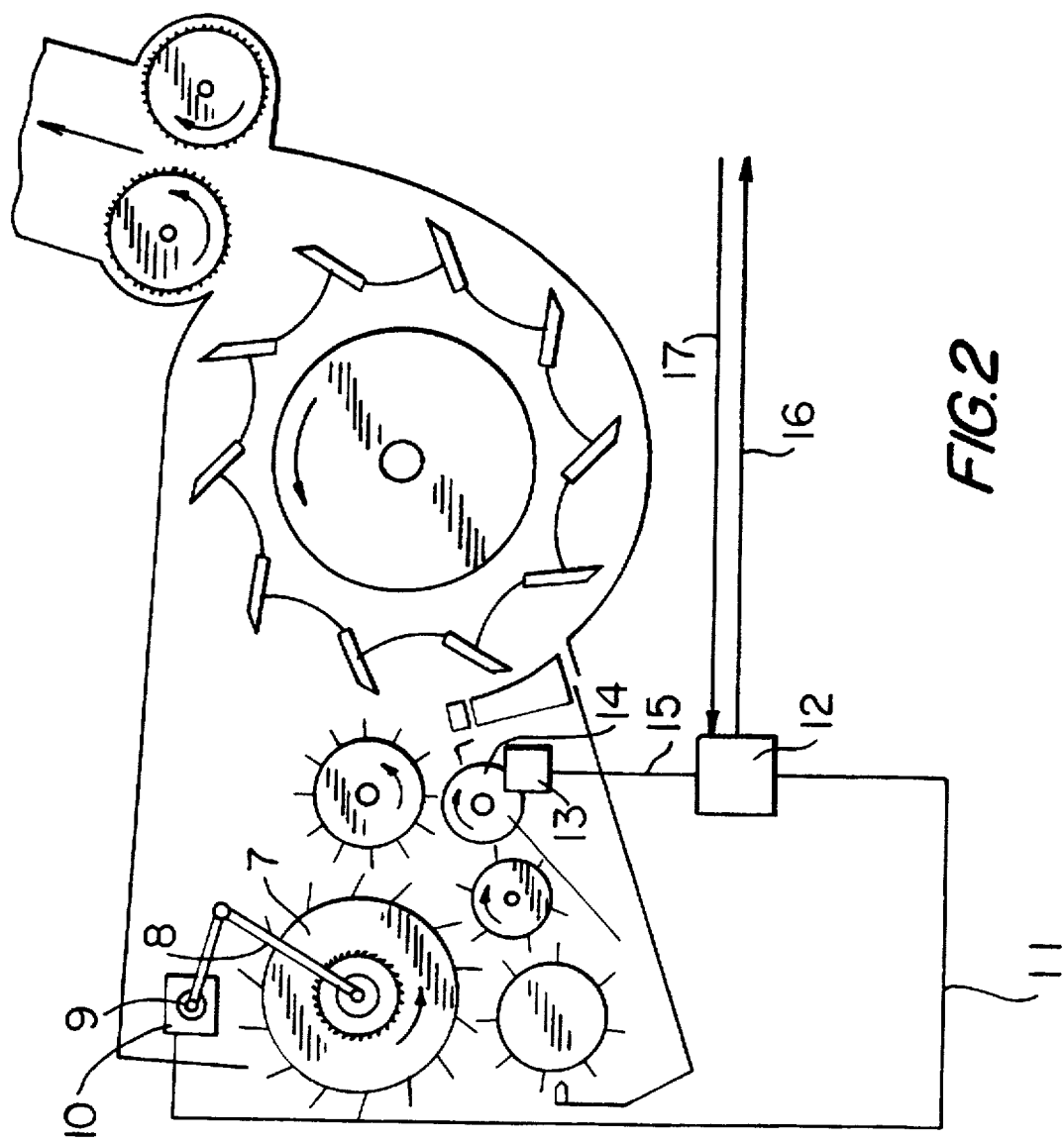
FIG. 2 is a view showing a device for a throughput measurement of the field chopper in accordance with the present invention on an enlarged scale.

A lever system 8 is connected with the prepressing roller 7 as shown in FIG. 2. It transmits the vertical stroke movement of the prepressing roller 7 to a rotary axis 9 of a potentiometer 10. The proportional voltage produced by the potentiometer is converted into a signal value which is supplied through a conductor 11 to a microprocessor 12. An inductive transducer 13 also produces a signal value derived from the rotary speed of a prepressing roller 14, and this signal value is supplied through a conductor 15 to the microprocessor 12. A product flow quantity which flowed into the machine in a reference period is calculated in the microprocessor 12 from the obtained signal values for volume and speed. The calculated product flow quantity data can be further supplied through a conductor 16 to an indicating system or to subsequently arranged indicating or machine management systems.

In addition to the signal values for volume and speed, the microprocessor 12 can also receive signal values 17 from one or several sensors for determination of loading. Such signal values can be received for example from a torque measurement of the chopping drum, the attachment or the motor, or from a slippage measurement of the drive belt of the chopping drum. The slippage can be calculated from the difference of the nominal and actual rotary speeds measured by rotary speed sensors of the motor and the chopping drum. These signal values 17 can be used as correction values in the region of defined limiting values, in which with the measured deviation a prepressing roller approaches the upper and lower abutments or strikes against them. A correction value is required, since during movement of the prepressing roller 7 in the region of the lower abutment or abutting the prepressing roller 7 against the lower abutment, eventually too little harvested product flows into the gap 4 formed by the prepressing rollers to completely feel the cross-section of the gap 4. The measuring value determined from the measured volumes and speed would lead to a too high yield, while during movement of the prepressing roller 7 in the upper region of the abutment or abutting of the prepressing roller 7 against the upper abutment an additional pressing action on the throughflowing harvested product is applied. Thereby actually more harvested product flows through the machine than indicated by the measuring value determined from volumes and speed. In these limiting regions, the additional consideration of measuring values leads to the loading of the individual machine components to an accurate measuring result.

Figure 3:
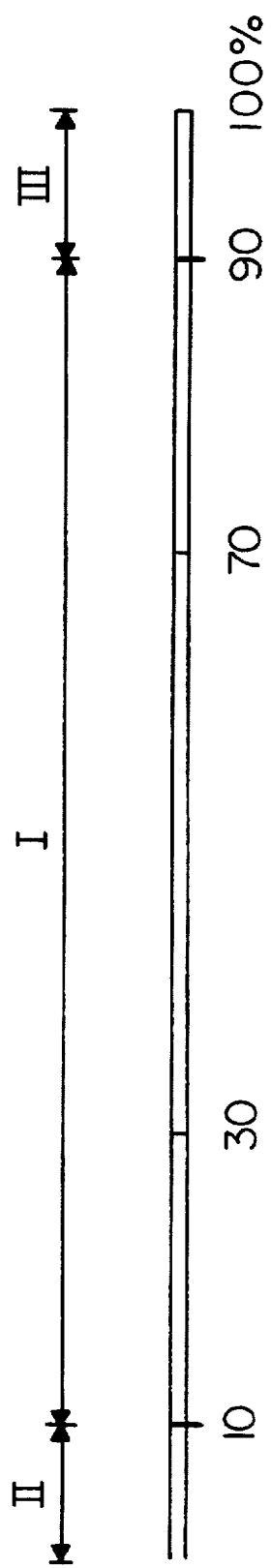
FIG. 3 is a view showing various program steps of a method for a throughput measurement in accordance with the present invention for accurate calculation of absolute throughflow values of a harvested product flowing through the field chopper.

FIG. 3 schematically shows an example of program steps for performing an exact determination of the absolute throughflow quantity. The measurable deviation of a prepressing roller 7 in percentages is plotted on the X axis. In the region I which covers for example between 10% and 90% deviation, the microprocessor utilizes exclusively the signal values determined by the throughput measuring device for calculation of the absolute throughflow quantity. In the region II located for example within 0% and 10% deviation and in the region III located for example between 90% and 100% deviation, the microprocessor corrects the measuring values of the throughput measuring device with the measuring values obtained from the sensors for loading determination. In order to provide an accurate interpretation, the measuring values obtained from the sensors for loading determination must be subjected to continuous adjusted correlation of the measuring values determined by the sensor system for loading determination and the throughput measuring device with respect to the changing sharpness of the cutter of the chopping device, before they are used as correction values.

A further embodiment of the invention proposes to avoid calculation of the correction factors when the prepressing roller 7 is deviated in the regions II and III of the defined limiting values. For this purpose the correction factor is determined when the deviation of the prepressing roller approaches the defined limiting value. For example, this correction factor calculation is performed within the region I in the zones from 10% to 30% and from 70% to 90%.

It will be understood that each of the elements described above, or two or more together, may also find a useful application in other types of methods and constructions differing from the types described above.

While the invention has been illustrated and described as embodied in a device for and a method of a throughput measurement in agricultural machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

I claim:

1. An agricultural machine, comprising a frame; harvested product treating means arranged on said frame and including a supply unit with a plurality of vertically movable prepressing rollers for prepressing and supplying a harvested product, at least one chopping drum for chopping the harvested product, and a throwing element for discharging the harvested product from the machine; and means for measuring a throughput of a harvested product through the machine, said throughput measuring means having a first element which converts a vertical movement of at least one prepressing roller caused by the harvested product into a first signal value, a second element which measures a throughflow speed of a product stream flowing through the machine and converts it into a second signal value; and microprocessor means receiving said first and said second signal values continuously and calculating from them an absolute quantity measuring value.

2. An agricultural machine as defined in claim 1, wherein said first element includes a potentiometer having a rotatable potentiometer axis and a lever system which connects said potentiometer with said at least one prepressing roller, so that a rotary movement of said potentiometer axis actuated by said lever system is converted by said potentiometer into a proportional voltage.

3. An agricultural machine as defined in claim 1, and further comprising means forming a prepressing passage, said prepressing rollers including prepressing rollers located in said prepressing passage, said at least one prepressing roller whose vertical movement caused by the harvested product is converted into said first mentioned signal value being located behind said prepressing rollers located in said prepressing passage.

4. An agricultural machine as defined in claim 1, wherein said second element is formed which measures the throughflow speed of the product flow passing through the machine is formed as a rotary speed sensor associated with said one prepressing roller.

5. An agricultural machine as defined in claim 4, wherein said rotary sensor is formed as an inductive transducer which measures fraction of revolutions of said one prepressing roller.

6. An agricultural machine as defined in claim 4, wherein said rotary sensor is formed so as to determine an average effective diameter of said one prepressing roller in order to take it into consideration for determining a rotary speed of said one prepressing roller.

7. An agricultural machine as defined in claim 1, wherein said first element which determines the vertical movement of said at least one prepressing roller is formed so that it continuously measures the deviation of said at least one prepressing roller with a high scanning rate and supplies a signal to an average value formation to obtain a uniform yield signal.

8. An agricultural machine as defined in claim 7; and further comprising means for indicating the yield signal together with an associated position of the agricultural machine.

9. An agricultural machine as defined in claim 8, wherein said indicating means is a board computer of the agricultural machine.

10. An agricultural machine as defined in claim 8, wherein said indicating means is formed so that they provide indication in a time rhythm.

11. An agricultural machine as defined in claim 8, wherein said indicating means is formed so that it provides an indication after a predetermined stroke.

12. An agricultural machine as defined in claim 8, wherein said indicating means is formed so that it provides an indication in dependence on a magnitude of changes of a throughput signal.

13. An agricultural machine as defined in claim 1, and further comprising sensor means for determining loading to take into consideration with the determined measuring values.

14. An agricultural machine as defined in claim 13, wherein said sensor means includes means for measuring a torque of said chopping drum.

15. An agricultural machine as defined in claim 13, wherein said sensor means includes means for measuring a torque of said receiving means.

16. An agricultural machine as defined in claim 13; and further comprising a motor, said sensor means including means for measuring a torque of said motor.

17. An agricultural machine as defined in claim 13; and further comprising a drive belt for said chopping drum, said sensor means including means for measuring a slippage of said drive belt for said chopping drum.

18. An agricultural machine as defined in claim 16, wherein said means for measuring a torque of said motor is formed so as to use a value of a rotary speed force measured from a rotary speed of said motor.

19. An agricultural machine as defined in claim 16, wherein said motor is provided with an electronic motor regulator, said means for measuring a torque of said motor being formed so as to determine and evaluate an injection quantity of said electronic motor regulator.

20. An agricultural machine as defined in claim 13, wherein said chopping means has a cutter; and further comprising means for adjusting a correlation of measuring values of a loading determined by said sensor means and a throughput determined by said first element, to a changing sharpness of said cutter of said chopping means.

21. A method of measuring a throughput within an agricultural machine including a frame, harvested product treating means including a supply unit with a plurality of vertically movable prepressing rollers for prepressing and supplying a harvested product, at least one chopping drum for chopping the harvested product, and a throwing element for discharging the harvested product from the machine, the method comprising the steps of first determining a throughput by a first element which senses a vertical movement of at least one of the prepressing rollers caused by the harvested product and converts it into a first signal value; further determining a throughflow speed of a product flow flowing through the machine by a second element and converting it into a second signal value; and continuously calculating from the first and second signal values by a microprocessor an absolute quantity measuring value.

22. A method as defined in claim 21, wherein said determining and calculating is performed so that the microprocessor for calculation of a throughput quantity utilizes the signal value determined only by the first element in a region in which the measured vertical deviation of the at least one prepressing roller moves not in a region of defined limiting values of upper and lower abutments, and the microprocessor in the region of the defined limiting values in which a measured horizontal deviation of a prepressing roller approaches the upper and lower abutments or strikes against them correlates the signal value produced by said first element with measuring values determined by a sensor system for determination of loading.

23. A method as defined in claim 22; and further comprising the step of adjusting a correlation of the measuring values obtained by a sensor system for determination of loading and the first element, to a changing sharpness of a cutter of the chopper drum.

24. A method as defined in claim 22; and further comprising the step of determining a correction factor when a microprocessor approaches the measured deviation of at least one prepressing roller in regions of defined limiting value in which the signal value determined by the first element is correlated with the signal value determined by the sensor system for determination of loading, from measuring values determined by the sensor system for determination of loading; and using the correction factor during reaching of the defined limiting value of the measured deviation of the at least one prepressing roller as a computation factor.

* * * * *